(No Model.)

F. SWEETLAND.
TIRE FOR VEHICLES.

No. 468,370. Patented Feb. 9, 1892.

Witnesses
F. M. Johnson.
H. F. Riley.

Inventor
Frank Sweetland
By his Attorneys,
C. A. Snow & Co.

UNITED STATES PATENT OFFICE.

FRANK SWEETLAND, OF ANGOLA, NEW YORK.

TIRE FOR VEHICLES.

SPECIFICATION forming part of Letters Patent No. 468,370, dated February 9, 1892.

Application filed November 2, 1891. Serial No. 410,653. (No model.)

*To all whom it may concern:*

Be it known that I, FRANK SWEETLAND, a citizen of the United States, residing at Angola, in the county of Erie and State of New York, have invented a new and useful Tire for Vehicles, of which the following is a specification.

The invention relates to improvements in tires for bicycles and the like.

The object of the present invention is to provide a simple and inexpensive bicycle-tire which will be light and durable and which will be very elastic or springy.

The invention consists in the construction and novel combination and arrangement of parts, hereinafter fully described, illustrated in the accompanying drawings, and pointed out in the claim hereto appended.

Figure 1:
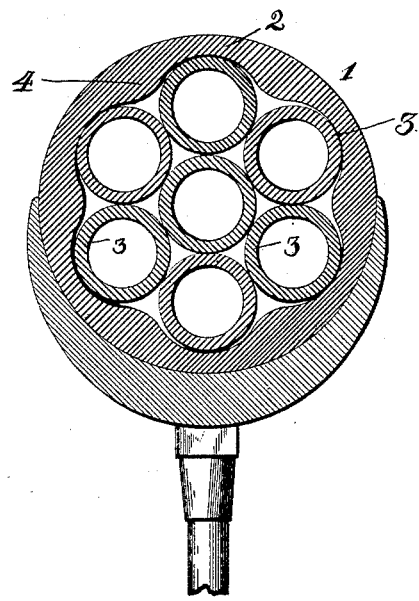
Figure 2:
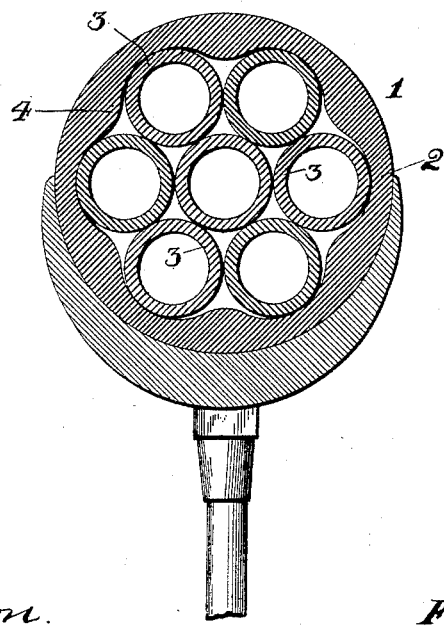

In the drawings, Figure 1 is a transverse sectional view of a bicycle-tire constructed in accordance with this invention. Fig. 2 is a similar view illustrating an arrangement of tubes different from that shown in Fig. 1.

Like numerals of reference indicate corresponding parts in both the figures of the drawings.

1 designates a bicycle-tire adapted to be arranged in a concave felly in the usual manner, and composed of an outer tube 2 and inner tubes 3, arranged within the outer tube and forming an elastic tire. The inner tubes 3 are constructed of rubber or other elastic material and are preferably seven in number. The outer tube 2 is provided on its interior face with longitudinal ribs or enlargements 4, which fill the outer recesses formed by the inner tubes 3 and equalize and distribute the pressure on the inner tubes, and these ribs or enlargements 4 form between them longitudinal grooves or seats to receive the inner tubes.

It may be found advantageous to arrange the tubes as illustrated in Fig. 1, where three tubes 3 are arranged vertically and are interposed between the tread of the outer tube and a point diametrically opposite the same. It will also be found of advantage to have the tread or that portion of the outer tube which comes in contact with the ground thickened, and in this case the tubes will be arranged as shown in Fig. 2, with one of the longitudinal ribs or enlargements 4 arranged at the tread. The outer tube is constructed of some elastic material possessing the necessary strength and durability, and the entire spring and elasticity of the tire is gained by the inner tubes.

Tires constructed in accordance with this invention possess a very quick and springy elasticity, which is an essential quality in the proper action of a good bicycle-tire, and the tire is also light in weight and very durable.

What I claim is—

A tire comprising an outer tube provided with longitudinal ribs or enlargements forming grooves or seats between them, and a series of elastic tubes arranged within the outer tube and located in the seats or grooves and having the outer recesses formed by them filled by the said ribs or enlargements, substantially as described.

In testimony that I claim the foregoing as my own I have hereto affixed my signature in the presence of two witnesses.

FRANK SWEETLAND.

Witnesses:
 E. M. CLARK,
 F. LEVERS.